(12) United States Patent
Narita et al.

(10) Patent No.: US 10,829,124 B2
(45) Date of Patent: Nov. 10, 2020

(54) EVACUATION DRIVING ASSISTANCE SYSTEM

(71) Applicant: DENSO CORPORATION, Kariya, Aichi-pref. (JP)

(72) Inventors: Takahiro Narita, Kariya (JP); Masao Oooka, Kariya (JP); Masuhiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 15/751,436

(22) PCT Filed: Aug. 10, 2016

(86) PCT No.: PCT/JP2016/073538
§ 371 (c)(1),
(2) Date: Feb. 8, 2018

(87) PCT Pub. No.: WO2017/026506
PCT Pub. Date: Feb. 16, 2017

(65) Prior Publication Data
US 2018/0229736 A1    Aug. 16, 2018

(30) Foreign Application Priority Data

Aug. 10, 2015   (JP) .................................. 2015-158150

(51) Int. Cl.
*B60W 40/08*     (2012.01)
*G07C 5/00*      (2006.01)
(Continued)

(52) U.S. Cl.
CPC ............. *B60W 40/08* (2013.01); *B60K 28/06* (2013.01); *B60W 30/0956* (2013.01);
(Continued)

(58) Field of Classification Search
CPC ............. B60W 40/08; B60W 30/0956; B60W 30/181; B60W 50/14; B60W 2556/00;
(Continued)

(56) References Cited

U.S. PATENT DOCUMENTS

2010/0090839 A1*  4/2010  Omi ....................... B60K 28/04
                                                    340/575
2015/0153733 A1*  6/2015  Ohmura ................... G08G 1/20
                                                    701/23

FOREIGN PATENT DOCUMENTS

JP    2003-157493 A    5/2003
JP    2007-331652 A    12/2007
(Continued)

*Primary Examiner* — Russell Frejd
(74) *Attorney, Agent, or Firm* — Maschoff Brennan

(57) ABSTRACT

An evacuation driving assistance apparatus capable of evacuation driving toward an appropriate evacuation location is provided. In the evacuation driving assistance apparatus, a driver determination unit determines whether or not a driver of an own vehicle is in a normal-driving enabled state. If it is determined by the driver determination unit that the driver of the own vehicle is in a normal-driving disabled state, a notification unit provides a notification of location information of the own vehicle to a center. The center is capable of determining an evacuation location based on the location information of the own vehicle, and transmitting the evacuation location. A reception unit receives the evacuation location transmitted by the center. An evacuation driving execution unit executes evacuation driving toward the evacuation location received by the reception unit.

3 Claims, 5 Drawing Sheets

(51) Int. Cl.
   *G06K 9/00* (2006.01)
   *G08B 25/00* (2006.01)
   *G08B 21/06* (2006.01)
   *H04W 4/02* (2018.01)
   *G05D 1/00* (2006.01)
   *G08G 1/16* (2006.01)
   *B60K 28/06* (2006.01)
   *H04W 4/44* (2018.01)
   *G07C 5/08* (2006.01)
   *B62D 6/00* (2006.01)
   *B60W 30/095* (2012.01)
   *B60W 30/18* (2012.01)
   *B60W 50/14* (2020.01)

(52) U.S. Cl.
   CPC .......... *B60W 30/181* (2013.01); *B60W 50/14* (2013.01); *B62D 6/00* (2013.01); *G05D 1/0055* (2013.01); *G06K 9/00832* (2013.01); *G07C 5/00* (2013.01); *G07C 5/008* (2013.01); *G07C 5/0816* (2013.01); *G08B 21/06* (2013.01); *G08B 25/00* (2013.01); *G08G 1/16* (2013.01); *G08G 1/164* (2013.01); *H04W 4/02* (2013.01); *H04W 4/44* (2018.02); *B60W 2040/0827* (2013.01); *B60W 2040/0836* (2013.01); *B60W 2040/0845* (2013.01); *B60W 2540/24* (2013.01); *B60W 2540/26* (2013.01); *B60W 2556/00* (2020.02); *B60W 2756/10* (2020.02); *B60Y 2302/05* (2013.01); *G05D 2201/0213* (2013.01)

(58) Field of Classification Search
   CPC ..... B60W 2756/10; B60W 2040/0827; B60W 2040/0836; B60W 2040/0845; B60W 2540/24; B60W 2540/26; G07C 5/00; G07C 5/008; G07C 5/0816; G06K 9/00832; G08B 25/00; G08B 21/06; H04W 4/02; H04W 4/44; G05D 1/0055; G05D 2201/0213; G08G 1/164; G08G 1/16; B60K 28/06; B62D 6/00; B60Y 2302/05
   See application file for complete search history.

(56) References Cited

FOREIGN PATENT DOCUMENTS

| JP | 2008-210375 A | 9/2008 |
| JP | 2015-108860 A | 6/2015 |
| JP | 2015-133050 A | 7/2015 |

* cited by examiner

EVACUATION DRIVING ASSISTANCE SYSTEM

CROSS-REFERENCE TO RELATED APPLICATION

This application is based on and claims the benefit of priority from earlier Japanese Patent Application No. 2015-158150 filed Aug. 10, 2015, the description of which is incorporated herein by reference.

TECHNICAL FIELD

The present invention relates to an evacuation driving assistance system.

BACKGROUND ART

Conventionally, a vehicle stopping apparatus is known, configured to, upon detecting diminished consciousness of a driver of an own vehicle, forcibly stop the own vehicle at an evacuation location (i.e., a stopping location) that will not impede the road traffic flow of other vehicles (PLT 1). The vehicle stopping apparatus disclosed in PLT 1 captures a forward image using a camera mounted in the own vehicle, and based on the image, determines such an evacuation location.

CITATION LIST

Patent Literature

[PTL 1] JP-A-2007-331652

SUMMARY OF THE INVENTION

Technical Problem

As set forth above, the technique disclosed in PLT 1 determines the evacuation location based on the image captured by the camera mounted in the own vehicle. Thus, if there is not any appropriate evacuation location within an imaging field of the camera, it is impossible to determine an evacuation location. In addition, even if there is a more appropriate evacuation location outside the imaging field of the camera, it is impossible to select such a more appropriate evacuation location.

In consideration of the foregoing, exemplary embodiments of the present invention are directed to providing an evacuation driving assistance system capable of evacuation driving toward an appropriate evacuation location.

Solution to Problem

In an aspect of the present invention, an evacuation driving assistance apparatus includes: a driver determination unit configured to determine whether or not a driver of an own vehicle is in a normal-driving enabled state; a notification unit configured to, if it is determined by the driver determination unit that the driver of the own vehicle is in a normal-driving disabled state, provide a notification of location information of the own vehicle to a center capable of determining an evacuation location based on the location information of the own vehicle and transmitting the evacuation location; a reception unit configured to receive the evacuation location transmitted by the center; and an evacuation driving execution unit configured to execute evacuation driving toward the evacuation location received by the reception unit.

The evacuation driving assistance apparatus provides a notification including location information of the own vehicle to the center if determining that the driver of the own vehicle is in a normal-driving disabled state that is a state of the driver of the own vehicle where the driver of the own vehicle is unable to normally drive the own vehicle. The center is capable of determining an evacuation location based on the location information of the own vehicle and transmitting the determined evacuation location.

The evacuation driving assistance apparatus receives the evacuation location determined and transmitted by the center and executes evacuation driving toward the evacuation location.

Therefore, even if there is not any appropriate evacuation location within a detection area of a sensor (e.g., a camera) mounted in the own vehicle, the evacuation driving assistance apparatus configured as above can receive the evacuation location from the center and execute evacuation driving toward the evacuation location.

In another aspect of the present invention, an evacuation driving assistance system includes the evacuation driving assistance apparatus and the center configured as above. In the evacuation driving assistance system of this aspect, the evacuation driving assistance apparatus provides a notification including location information of the own vehicle to the center if determining that the driver of the own vehicle is in a normal-driving disabled state. In response to the notification, the center determines an evacuation location and transmits the determined evacuation location. The evacuation driving assistance apparatus receives the evacuation location transmitted by the center and executes evacuation driving toward the evacuation location.

Therefore, even if there is not any appropriate evacuation location within a detection area of a sensor (e.g., a camera) mounted in the own vehicle, the evacuation driving assistance apparatus configured as above can receive the evacuation location from the center and execute evacuation driving toward the evacuation location.

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

1. Evacuation Driving Assistance System Configuration

Figure 1:
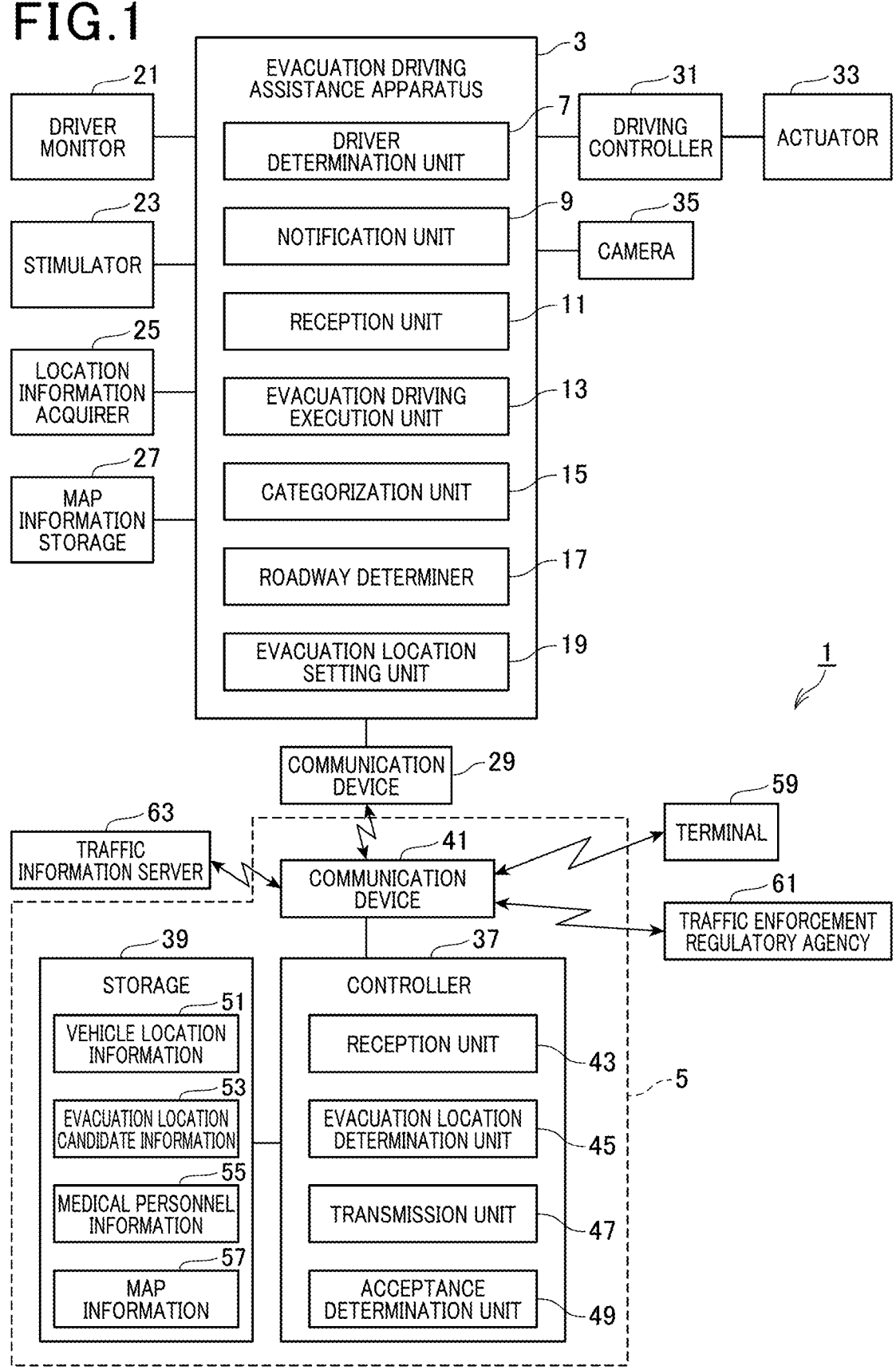
FIG. 1 is a block diagram of an evacuation driving assistance system in accordance with one embodiment of the present invention.

A configuration of an evacuation driving assistance system 1 will now be described with reference to FIG. 1. The evacuation driving assistance system 1 includes an evacuation driving assistance apparatus 3 and a center 5. The evacuation driving assistance apparatus 3 is mounted in a vehicle. The vehicle carrying the evacuation driving assistance apparatus 3 is hereafter referred to as an own vehicle.

The evacuation driving assistance apparatus 3 may be configured as a well-known computer including a central processing unit (CPU), a random access memory (RAM), a read-only memory (ROM), and an input/output interface or the like. The processing described later is performed by the CPU executing various programs stored in the ROM or RAM. The evacuation driving assistance apparatus 3 includes, as functional blocks, a driver determiner 7, a notification unit 9, a reception unit 11, an evacuation driving execution unit 13, a categorization unit 15, a roadway determiner 17, and an evacuation location setting unit 19. Functions of these blocks will be described later.

The own vehicle includes a driver monitor 21, a stimulator 23, a location information acquirer 25, a map information storage 27, a communication device 29, a driving controller 31, an actuator 33, and a camera 35, in addition to the evacuation driving assistance apparatus 3.

The driver monitor 21 monitors the driver of the own vehicle. The driver monitor 21 acquires, for example, an image including the driver's face (hereinafter referred to as a face image), and extracts features of the driver's face (for example, a face direction, an amount of eye opening, an eyebrow position and angle, a color of the face, etc.) from the face image. In addition, the driver monitor 21 may acquire, for example, a driver's heart rate, an electrocardiogram, a blood pressure, a pulse wave, a brain wave, or a type or quantity of each substance included in the driver's exhalation (for example, alcohol or drugs).

The stimulator 23 provides at least one of sound, light, smell, and vibration to the driver of the own vehicle. As described later in more detail, this stimulation is used for categorizing states of the driver.

The location information acquirer 25 acquires own-vehicle location information using the global positioning system (GPS) or the like. The location information is information of an absolute location specified by a latitude and longitude on the earth.

The map information storage 27 stores map information. The map information includes information representing road types (such as an expressway, an ordinary road or the like) and information representing locations of service areas (SA) and parking areas (PA).

The communication device 29 can wirelessly communicate with external devices. The external devices include a center 5.

The driving controller 31 outputs an engine output command value, a steering output command value, and a braking output command value to the actuator 33 in response to an instruction from the evacuation driving assistance apparatus 3. The actuator 33 operates an engine, a steering system, and a brake of the own vehicle based on the engine output command value, the steering output command value, and the braking output command value.

The evacuation driving assistance apparatus 3 can cause the own vehicle to travel in an instructed direction and at an instructed speed using the driving controller 31 and the actuator 33.

In addition, the actuator 33 transmits an engine output run value, a steering output run value, and a braking output run value back to the driving controller 31. In addition, the driving controller 31 transmits a driving run value back to the evacuation driving assistance apparatus 3.

The camera 35 looks in a forward direction of the own vehicle to capture forward images. The field of capture of the camera 35 includes a roadway forward of the own vehicle (and possibly a roadside).

The center 5 is located separate from the own vehicle. The center 5 may reside at a fixed location or may be mounted on a mobile object other than the own vehicle. The center 5 includes a controller 37, a storage 39, and a communication device 41. The controller 37 may be configured as a well-known computer including a central processing unit (CPU), a random access memory (RAM), a read-only memory (ROM), and an input/output interface or the like. The processing described later is performed by the CPU executing various programs stored in the ROM or the like. The controller 37 includes, as functional blocks, a reception unit 43, an evacuation location determination unit 45, a transmission unit 47, and an acceptance determination unit 49. Functions of these blocks will be described later.

The storage 39 stores vehicle location information 51, evacuation location candidate information 53, medical personnel information 55, and map information 57. The vehicle location information 51 is location information of each vehicle used by medical personnel (for example, doctors, nurses, emergency personnel) for transportation (hereinafter referred to as a medical-related vehicle). The vehicle location information 51 may include location information of a plurality of such medical-related vehicles.

The evacuation location candidate information 53 is location information of locations selectable as an evacuation location (evacuation location candidates). The evacuation location candidate information 53 may include location information of a plurality of evacuation location candidates. The medical personnel information 55 includes an address of each preregistered medical personnel (for example, an e-mail address, a telephone number or the like) and identification information of each medical personnel. The medical personnel information 55 may include addresses and identification information of a plurality of medical personnel. The map information 57 is map information representing at least a location of each medical-related vehicle and a location of each evacuation location candidate.

The communication device 41 can wirelessly communicate with external devices. The external devices include the evacuation driving to assistance apparatus 3, terminals 59 held by the medical personnel, a traffic enforcement regulatory agency (e.g., police) 61, and a traffic information server 63.

2. Processing Performed by Evacuation Driving Assistance Apparatus

Figure 2:
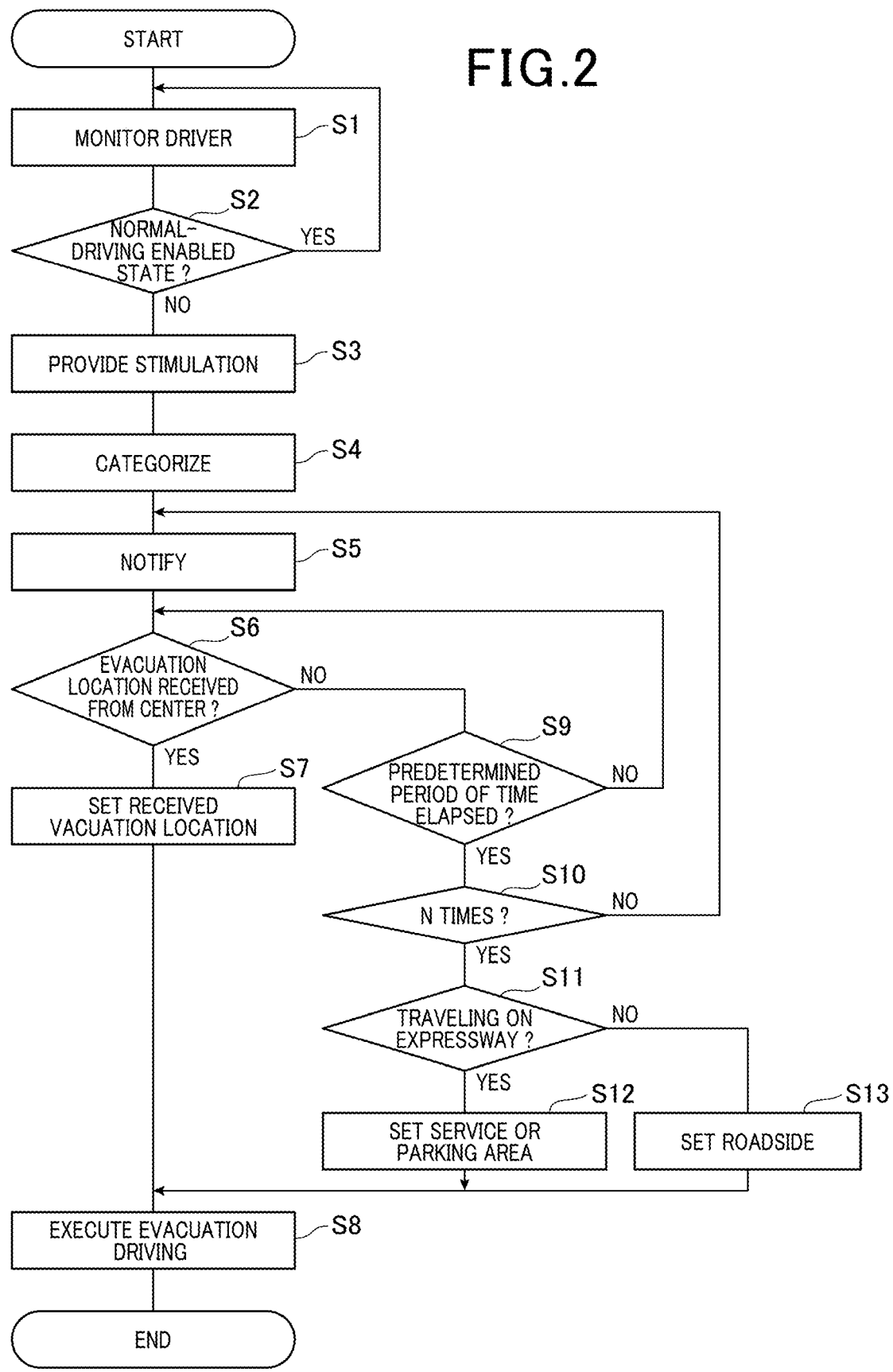
FIG. 2 is a flowchart of processing performed by an evacuation driving assistance apparatus shown in FIG. 1.
Figure 4:
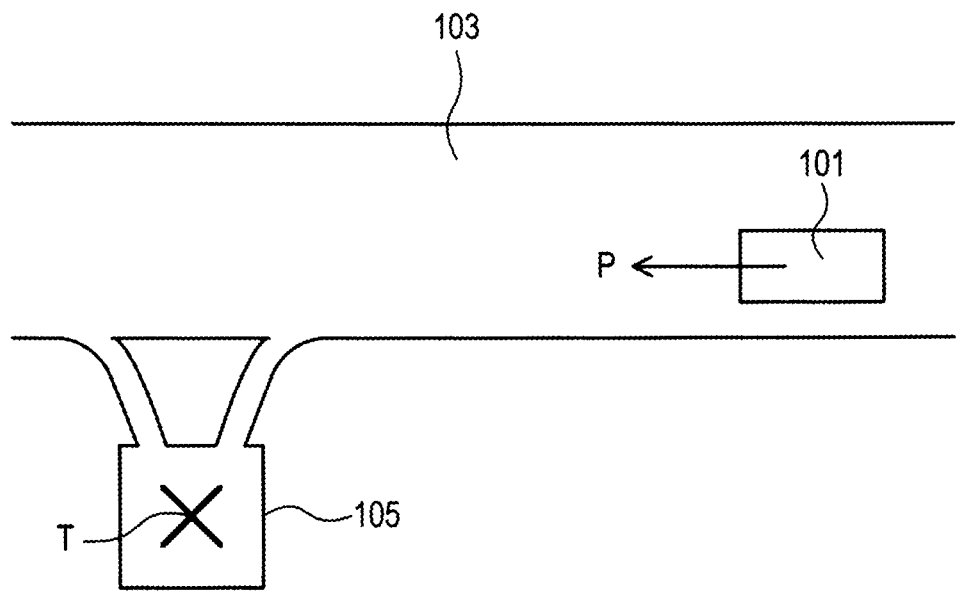
FIG. 4 is an example of setting an evacuation location while an own vehicle is traveling on an expressway.

Processing performed by the evacuation driving assistance apparatus 3 will now be described with reference to FIGS. 2, 4, and 5. Referring to FIG. 2, at step S1, the driver determination unit 7 monitors the driver of the own vehicle using the driver monitor 21.

At step S2, based on a result of monitoring at step S1, the driver determination unit 7 determines whether or not the driver is in a normal-driving enabled state that is a state where the driver is able to normally drive the own vehicle.

For example, in cases where the driver monitors 21 is configured to acquire the face image of the driver and extracts a facial feature of the driver from the face image, the driver determination unit 7 determines whether the driver is in the normal-driving enabled state based on the extracted feature. More specifically, if the extracted feature indicates diminished consciousness of the driver (for example, a feature that the driver is lying his/her face down for a certain time period or more, a feature that the driver is closing his/her eyes for a certain time period or more, or the like), the driver determination unit 7 determines that the driver is in a normal-driving disabled state that is a state where the driver is unable to normally drive the own vehicle. Otherwise, the driver determination unit 7 determines that the driver is in the normal-driving enabled state.

In cases where the driver monitors 21 is configured to acquire a heart rate, an electrocardiogram, a blood pressure, a pulse wave, a brain wave, a type or amount of substance (for example, alcohol) included in exhalation of the driver, the driver determination unit 7 determines whether or not the driver is in the normal-driving enabled state based on an acquisition result.

If it is determined by the driver determination unit 7 that the driver is in the normal-driving disabled state, the process flow proceeds to step S3. If it is determined by the driver determination unit 7 that the driver is in the normal-driving enabled state, the process flow returns to step S1.

At step S3, the categorization unit 15 provides stimulation to the driver using the stimulator 23.

At step S4, using the driver monitor 21, the categorization unit 15 acquires a state of the driver after provision of stimulation to the driver. Based on an acquisition result, the categorization unit 15 determines which one of the plurality of categories the driver falls into.

The plurality of categories include a drowsiness state, an illegal state, and a critical illness state. The drowsiness state is a state such that upon arousal from catnap, the driver can return to the normal-driving enabled state. If the result of monitoring by the driver monitor 21 after provision of stimulation to the driver by the stimulator 23 indicates a sigh of the driver regaining consciousness and no feature corresponding to consumption of alcohol or drugs (for example, a high alcohol concentration in the exhalation, a behavior or look specific to the intoxicated state, or the like), the categorization unit 15 determines that the driver is in the drowsiness state.

The illegal state is a state such that driving by the driver is illegal even if the driver has returned to a state where the driver can drive the own vehicle from the intoxicated state due to consumption of alcohol or drugs. If the result of monitoring by the driver monitor 21 after provision of stimulation to the driver by the stimulator 23 indicates a sign of the driver regaining consciousness, but indicates a feature corresponding to consumption of alcohol or drugs, then the categorization unit 15 determines that the driver is in the illegal state.

The critical illness state is a state such that the driver's consciousness is diminished due to critical illness, such as epilepsy, heart disease or the like, and the driver cannot return to the normal-driving enabled state. If the result of monitoring by the driver monitor 21 after provision of stimulation to the driver by the stimulator 23 indicates no sign of the driver regaining consciousness, then the categorization unit 15 determines that the driver is in the critical illness state.

At step S5, the notification unit 9 provides a notification to the center 5 using the communication device 29. The notification includes a request for transmission of an evacuation location, own-vehicle location information acquired from the location information acquirer 25, and a result of categorization at step S4.

At step S6, the reception unit 11 determines whether or not the communication device 29 has received the evacuation location from the center 5. The evacuation location is transmitted by the center 5 at step S24 as described later. If it is determined that the communication device 29 has received the evacuation location from the center 5, then the process flow proceeds to step S7. Otherwise, the process flow proceeds to step S9.

At step S7, the evacuation location setting unit 19 sets the evacuation location received at step S6 as an evacuation location for evacuation driving.

At step S8, using the driving controller 31 and the actuator 33, the evacuation driving execution unit 13 executes evacuation driving toward the evacuation location set at step S7 or set at step S12 or S13 as described later. Evacuation driving is automatic driving. More specifically, the evacuation driving execution unit 13 sets a route from the current location of the own vehicle to the evacuation location using map information stored in the map information storage 27. The evacuation driving execution unit 13 instructs the driving controller 31 to cause the own vehicle to travel along the route at a target speed. In addition, the evacuation driving execution unit 13 regularly acquires own-vehicle location information using the location information acquirer 25 to calculate an error between an actual location of the own vehicle and a target location on the route, thereby providing feedback to the driving instruction for the driving controller 31 to minimize the error.

If at step S6 it is determined by the reception unit 11 that the communication device 29 has not received the evacuation location from the center 5, then at step S9 the reception unit 11 determines whether a predetermined period of time has elapsed since the last notification at step S5. If the predetermined period of time has elapsed since the last notification, then the process flow proceeds to step S10. Otherwise, the process flow returns to step S6.

At step S10, the reception unit 11 determines whether or not notification at step S5 has been repeatedly performed N times. N is a predetermined positive integer. If notification at step S5 has been repeatedly performed N times, then the process flow proceeds to step S11. Otherwise, the process flow returns to step S5.

At step S11, the roadway determiner 17 determines whether or not the own vehicle is traveling on an expressway. More specifically, the roadway determiner 17 acquires the own-vehicle location information using the location information acquirer 25 and matches the own-vehicle location information to the map information stored in the map information storage 27. If the location of the own vehicle is on an expressway, it is determined that the own vehicle is traveling on the expressway. If the location of the own vehicle is on a regular road, then it is determined that the own vehicle is not traveling on an expressway.

If it is determined by the roadway determiner 17 that the own vehicle is traveling on an expressway, then the process flow proceeds to step S12. If it is determined by the roadway determiner 17 that the own vehicle is not traveling on an expressway, then the process flow proceeds to step S13.

At step S12, the evacuation location setting unit 19 sets the service or parking area that the own vehicle can enter in the future as an evacuation location. That is, as shown in FIG. 4, the evacuation location setting unit 19 sets one 105 of the service or parking areas along the expressway 103 that the own vehicle 101 is traveling, located forward in the travel direction P of the own vehicle 101 and closest to the own vehicle 101 as an evacuation location T.

Figure 5:
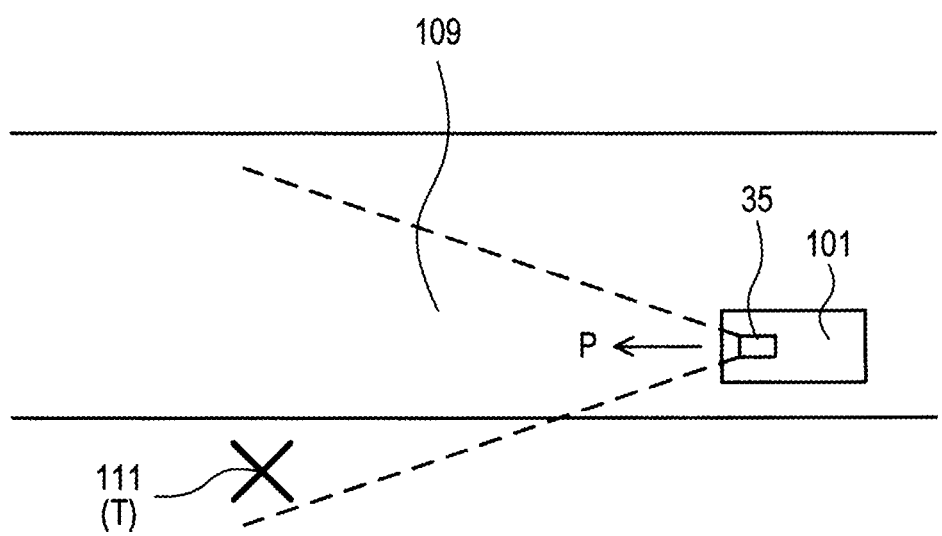
FIG. 5 is an example of setting an evacuation location while an own vehicle is traveling on a regular road.

Returning to FIG. 2, at step S13, the evacuation location setting unit 19, as shown in FIG. 5, captures an image of a regular road 109 forward of the own vehicle 101 using the camera 35, and sets a roadside 111 of the regular road 109 as an evacuation location T. Typically, the regular road 109 has intersections therealong. Therefore, even if the own vehicle 101 is stopped at the roadside 111, another vehicle can bypass the own vehicle 101 stopped at the roadside 111.

3. Processing Performed by Center

Figure 3:
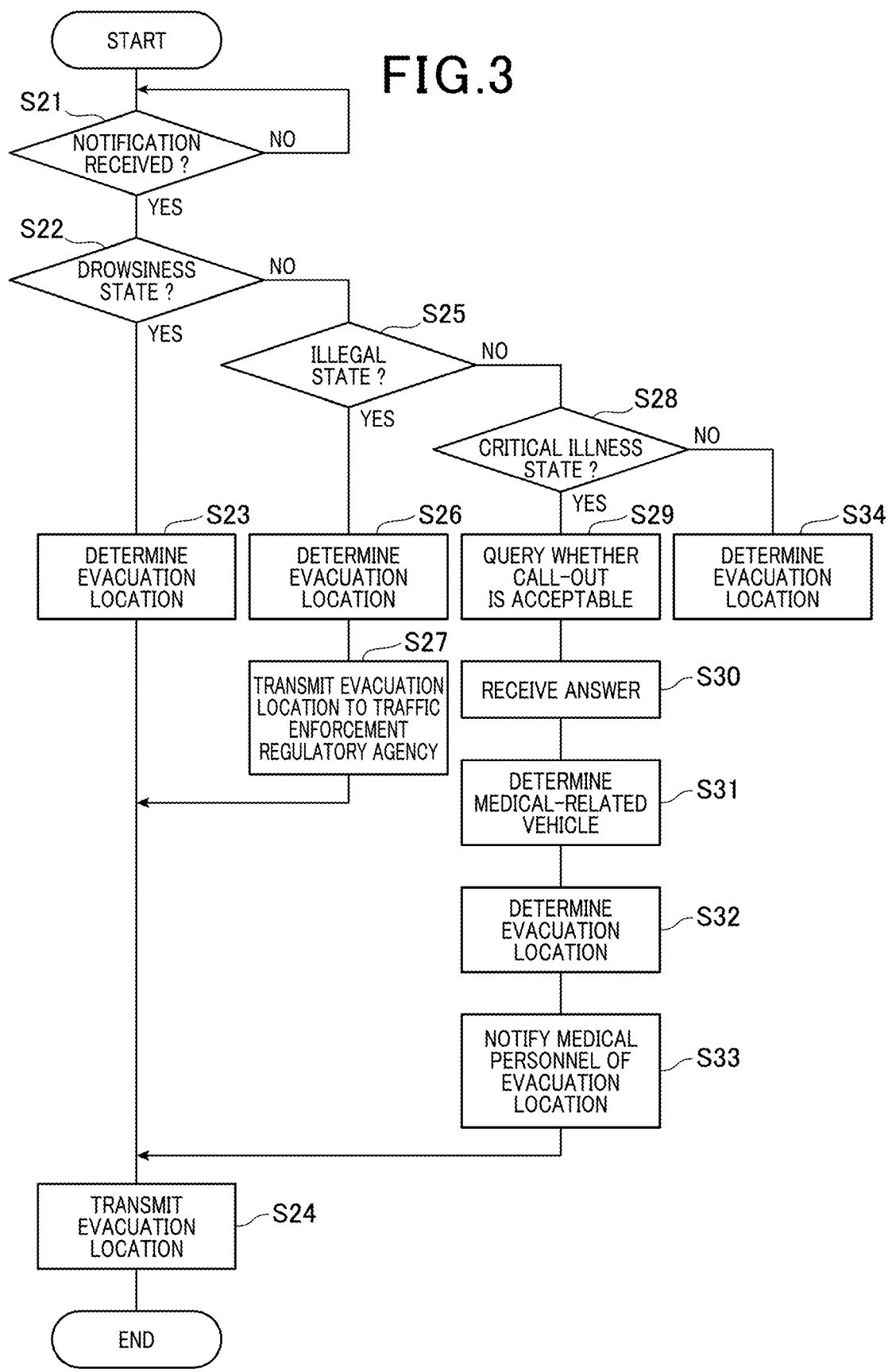
FIG. 3 is a flowchart of processing performed by a center shown in FIG. 1.
Figure 6:
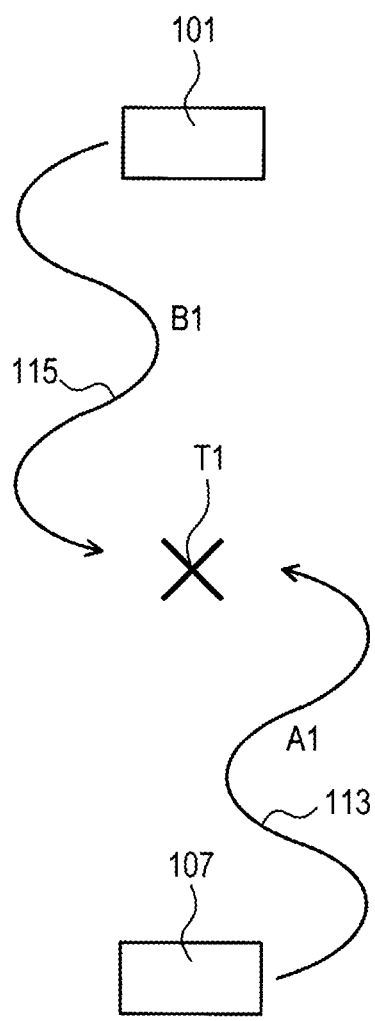
FIG. 6 is an example of determining an evacuation location by a center when a driver is a critical illness state.

Processing performed by the center 5 will now be described with reference to FIGS. 3 and 6. At step S21 in FIG. 3, the reception unit 43 determines whether or not the notification transmitted by the evacuation driving assistance apparatus 3 at step S5 has been received. If the notification has been received, the process flow proceeds to step S22. Otherwise, the process flow returns to step S21.

At step S22, the evacuation location determination unit 45 determines whether or not the category of driver state included in the notification received at step S21 is the drowsiness state. If the category of driver state is the drowsiness state, the process flow proceeds to step S23. Otherwise, the process flow proceeds to step S25.

At step S23, the evacuation location determination unit 45 determines the evacuation location based on the own-vehicle location information included in the notification received at step S21. The evacuation location determination unit 45 selects one of the evacuation location candidates included in the evacuation location candidate information 53 stored in the storage 39, closest to the own vehicle, as the evacuation location.

At step S24, the transmission unit 47 transmits the evacuation location determined at step S23 or at step S26, S32, or S34 as described later using the communication device 41.

If at step S22 it is determined that the category of driver state included in the notification received at step S21 is not the drowsiness state, then the process flow proceeds to step S25. At step S25, the evacuation location determination unit 45 determines whether or not the category of driver state included in the notification received at step S21 is the illegal state. If the category of driver state is the illegal state, then the process flow proceeds to step S26. Otherwise, the process flow proceeds to step S28.

At step S26, the evacuation location determination unit 45 determines the evacuation location based on the own-vehicle location information included in the notification received at step S21. The evacuation location is determined in a similar manner as in step S23.

At step S27, the transmission unit 47 transmits the evacuation location determined at step S26 to the traffic enforcement regulatory agency 61 using the communication device 41.

If the answer is "NO" at step S25, the process flow proceeds to step S28. At step S28, the evacuation location determination unit 45 determines whether or not the category of driver state included in the notification received at step S21 is the critical illness state. If at step S28 it is determined that the category of driver state is the critical illness state, then the process flow proceeds to step S29. Otherwise, the process flow proceeds to step S34.

At step S29, the acceptance determination unit 49 transmits to a terminal 59 held by each medical personnel a query as to whether or not the medical personnel can accept call-out (to be present at the evacuation location) using the communication device 41.

At step S30, the acceptance determination unit 49 acquires an answer to the query transmitted at step S29 using the communication device 41. The medical personnel can enter the answer to the query transmitted to the terminal 59 into the terminal 59. The terminal 59 transmits the entered answer, identification information (for example, identification number, name or the like) of the medical personnel and location information of the medical personnel to the center 5.

The acceptance determination unit 49 determines, for each medical personnel, whether or not the medical personnel can accept the call-out based on the acquired answer.

At step S31, the evacuation location determination unit 45 determines a medical-related vehicle to be directed to the evacuation location as follows. That is, the evacuation location determination unit 45 determines one of the medical-related vehicles having location information stored in the vehicle location information 51, having a shortest distance to the medical personnel determined to be able to accept call-out at step S30 as the medical-related vehicle to be directed to the evacuation location.

At step S32, based on the medical-related vehicle determined at step S31 and the own-vehicle location information included in the notification received at step S21, the evacuation location determination unit 45 determines the evacuation location as follows.

A plurality of evacuation location candidates includes in the evacuation location candidate information 53 are denoted by T1, T2, T3, . . . , Tn, where n is a positive integer. The evacuation location determination unit 45 calculates an amount of time A1 required for the medical-related vehicle 107 determined at step S31 to travel to the evacuation location candidate T1 (see FIG. 6). The amount of time A1 is calculated taking into account a length of the route 113 from the medical-related vehicle 107 to the evacuation location candidate T1, set using the map information 57, and a transportation condition (the presence or absence of traffic lights, the presence or absence of traffic jams, the number of lanes, etc.) on the route 113. The evacuation location determination unit 45 can acquire the transportation condition from the traffic information server 63.

In addition, the evacuation location determination unit 45 calculates an amount of time B1 required for the own vehicle 101 to travel to the evacuation location candidate T1. The amount of time B1 is calculated taking into account a length of the route 115 from the own vehicle 101 to the evacuation location candidate T1, set using the map information 57, and a transportation condition on the route 115. Subsequently, the evacuation location determination unit 45 compares the amount of time required A1 and the amount of time B1 to determine a larger one of them, max(A1, B1).

The evacuation location determination unit 45 calculates max(A2, B2), max(A3, B3), . . . , and max(An, Bn) for the respective evacuation location candidates T2, T3, . . . , and Tn. The evacuation location determination unit 45 determines the evacuation location candidate Ti (i being a number from 1 to n) that is a minimum one, max(Ai, Bi), of max(A1, B1), max(A2, B2), max(A3, B3), . . . , and max(An, Bn), as the evacuation location T.

Returning to FIG. 3, at step S33, the transmission unit 47 transmits a notification including the evacuation location determined at step S32 to the terminal 59 via the communication device 41.

If the answer is "NO" at step S28, then at step S34 the evacuation location determination unit 45 determines an evacuation location in a similar manner as in step S23.

4. Advantages of Present Embodiment (1A) With the evacuation driving assistance apparatus 3 and the evacuation driving assistance system 1, the own vehicle can execute evacuation driving toward an appropriate evacuation location without the evacuation location being limited to the imaging field of the camera 35.

(1B) The evacuation driving assistance apparatus 3 is configured to, if determining that the driver of the own vehicle is in the normal-driving disabled state, determines within which one of the plurality of predefined categories the normal-driving disabled state falls and notifies the center 5 of the result of determination.

The center 5 can take appropriate action in response to the result of determination. That is, if the state of the driver falls within the illegal state category, the center 5 transmits the evacuation location to the traffic enforcement regulatory agency 61.

If the state of the driver falls within the critical illness state category, the center 5 directs the medical-related vehicle to the evacuation location, which allows the driver in the critical illness state to be treated early or transported early to a hospital.

(1C) The evacuation driving assistance apparatus 3 is configured to, if no evacuation location has been received from the center 5 after providing the notification at step S5 and if it is determined that the own vehicle is to traveling on an expressway, set a service or parking area that the own vehicle can enter in the future as an evacuation location. With this configuration, an appropriate evacuation location can be set even without receiving an evacuation location from the center 5.

In addition, setting a service or parking area as the evacuation location T can prevent traffic jam, rear-ender or the like as compared to setting a roadside as the evacuation location T. If the center 5 determines that a roadside can be set as the evacuation location T taking into account the traffic stream or road width, the roadside may be set as the evacuation location T.

(1D) The center 5 determines an evacuation location based on a medical-related vehicle location and own-vehicle location information. With this configuration, an evacuation location appropriate for both the medical-related vehicle and the own vehicle can be determined.

(1E) The center 5 performs an operation at step S32 to determine an evacuation location. With this configuration, an evacuation location that allows the medical-related vehicle and the own vehicle to encounter each other at the earliest time can be determined.

Other Embodiments

The invention is not to be limited to the specific embodiment disclosed above. Various modifications may be made to the described embodiment.

(1) The driver determination unit 7 may be configured to determine whether or not the driver is in the normal-driving enabled state in another manner, For example, the driver determination unit 7 may be configured to store a history of driving operations of the driver or behaviors of the own vehicle and compare the driving operations or behaviors of the own vehicle with their patterns as the driver is in the normal-driving disabled state, thereby determining whether or not the driver is in the normal-driving enabled state.

(2) Other categories of normal-driving disabled state may be used. For example, categories of normal-driving disabled state may include the illegal state category and non illegal state category. Alternatively, categories of normal-driving disabled state may include the critical illness state category and non critical illness state category.

(3) The evacuation driving assistance apparatus 3 may be configured to, if the driver of the own vehicle is in the normal-driving disabled state and the own vehicle is traveling on an expressway, set a service or parking area along the expressway as an evacuation location, regardless of whether the evacuation location has been received from the center 5.

(4) The evacuation driving assistance apparatus 3 and the center 5 may directly communicate with each other or may indirectly communicate with each other via road side equipment or the like.

(5) At step S31, the medical-related vehicle to be directed to an evacuation location may be determined in another manner. For example, medical personnel holding a terminal 59 who provides an earliest answer to the query is selected and a medical-related vehicle closest to the selected medical personnel may be determined as a medical-related vehicle to be directed to the evacuation location.

(6) At step S32, the evacuation location T may be determined in another manner. For example, the following manner may be available. The evacuation location determination unit 45 may calculate a distance a1 of a route along which the medical-related vehicle 107 determined at step S31 travels to the evacuation location candidate T1. The evacuation location determination unit 45 may calculate a distance b1 of a route along which the own vehicle 101 travels to the evacuation location candidate T1. Subsequently, the evacuation location determination unit 45 may compare the distance a1 and the distance b1 and select a larger one of them, max(a1, b1).

Similarly, the evacuation location determination unit 45 may calculate max(a2, b2), max(a3, b3), . . . , and max(an, bn) for the respective evacuation location candidates T2, T3, . . . , and Tn. The evacuation location determination unit 45 may determine the evacuation location candidate Ti (i being a number from 1 to n) that is a minimum one, max(ai, bi), of max(a1, b1), max(a2, b2), max(a3, b3), . . . , and max(an, bn), as the evacuation location T.

(7) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(8) Besides the evacuation driving assistance system 1 and the evacuation driving assistance apparatus 3 disclosed above, the present invention may be embodied in various forms, such as programs enabling a computer to function as the evacuation driving assistance apparatus 3 and the controller 37 disclosed above, a computer readable medium bearing these programs, and an evacuation driving assistance method.

The invention claimed is:

1. An evacuation driving assistance system comprising:

an evacuation driving assistance apparatus; and a center capable of determining an evacuation location based on location information of an own vehicle that is a vehicle carrying the evacuation driving assistance apparatus and transmitting the evacuation location, wherein the evacuation driving assistance apparatus comprises:

a driver determination unit configured to determine whether or not a driver of an own vehicle is in a normal-driving enabled state that is a state of the driver of the own vehicle where the driver is able to normally drive the own vehicle;

a notification unit configured to, if it is determined by the driver determination unit that the driver of the own vehicle is in a normal-driving disabled state that is a state of the driver of the own vehicle where the driver is unable to normally drive the own vehicle, provide a notification including location information of the own vehicle to the center;

a reception unit configured to receive the evacuation location transmitted by the center; and an evacuation driving execution unit configured to execute evacuation driving toward the evacuation location received by the reception unit, the center comprises:

a storage storing locations of respective vehicles used by preregistered medical personnel for transportation;

an evacuation location determination unit configured to determine the evacuation location based on location information of the vehicles used by the medical personnel for transportation and the location information of the own vehicle included in the notification;

a transmission unit configured to transmit the evacuation location determined by the evacuation location determination unit; and an acceptance determination unit configured to determine, for each medical personnel, whether or not the medical personnel can accept call-out, and the evacuation location determination unit is configured to determine the evacuation location based on location information of one of the vehicles used by the medical personnel for transportation having a shortest distance to the medical personnel determined to be able to accept the call-out and the location information of the own vehicle included in the notification.

2. The evacuation driving assistance system according to claim 1, wherein the evacuation driving assistance apparatus further comprises a categorization unit configured to, if it is determined by the driver determination unit that the driver of the own vehicle is in the normal-driving disabled state, determine within which one of a plurality of predefined categories the normal-driving disabled state falls, and the notification unit is configured to notify the center of a result of determination by the categorization unit.

3. The evacuation driving assistance system according to claim 1, wherein the evacuation driving assistance apparatus further comprises:

a roadway determiner configured to determine whether or not the own vehicle is traveling on an expressway; and an evacuation location setting unit configured to, if the reception unit receives no evacuation location from the center even after notification by the notification unit and if it is determined by the roadway determiner that the own vehicle is traveling on an expressway, set a service or parking area that the own vehicle can enter in the future as an evacuation location.

* * * * *